United States Patent [19]
Wagner

[11] 3,819,232
[45] June 25, 1974

[54] VEHICLE SEAT CONSTRUCTION

[75] Inventor: Richard M. Wagner, Bloomfield Hills, Mich.

[73] Assignee: General Motors Corporation, Detroit, Mich.

[22] Filed: Aug. 21, 1972

[21] Appl. No.: 282,168

[52] U.S. Cl. .......................... 297/458, 297/DIG. 1
[51] Int. Cl. ............................................. A47c 7/02
[58] Field of Search ....... 297/252–460, 284, DIG. 4

[56] References Cited
UNITED STATES PATENTS

| | | | |
|---|---|---|---|
| 2,711,212 | 6/1955 | Hoag | 297/458 X |
| 3,099,482 | 7/1963 | Woodruff | 297/DIG. 1 |
| 3,353,869 | 11/1967 | Getz et al. | 297/458 X |
| 3,411,824 | 11/1968 | White et al. | 297/458 X |
| 3,462,196 | 8/1969 | Arnold et al. | 297/455 |
| 3,495,871 | 2/1970 | Resag et al. | 297/284 |
| 3,499,682 | 3/1970 | Orenstein | 297/458 X |
| 3,604,752 | 9/1971 | Macknick | 297/455 |

Primary Examiner—Paul H. Gilliam
Attorney, Agent, or Firm—W. A. Schuetz

[57] ABSTRACT

This disclosure relates to a vehicle seat construction which comprises a seat frame that has cushion and back support portions, a padded cushion trim assembly, and a padded back trim assembly. The cushion trim assembly is peripherally secured to the cushion support portion of the frame and is suspended thereacross. The cushion trim assembly has a rearward portion which is contoured upwardly adjacent the back support portion of the frame and is connected therewith with resilient means to provide for the cushion trim assembly to conform to the shape of an occupant. The back trim assembly is positioned upon the back support portion of the frame and has a lower portion which depends forwardly over and engages the upwardly contoured rearward portion of the cushion trim assembly. The cushion and back trim assemblies, when the seat construction is occupied, conform to the shape of the occupant with the rearward portion of the cushion trim assembly and the lower portion of the back trim assembly firmly supporting the lower back of the seat occupant.

3 Claims, 4 Drawing Figures

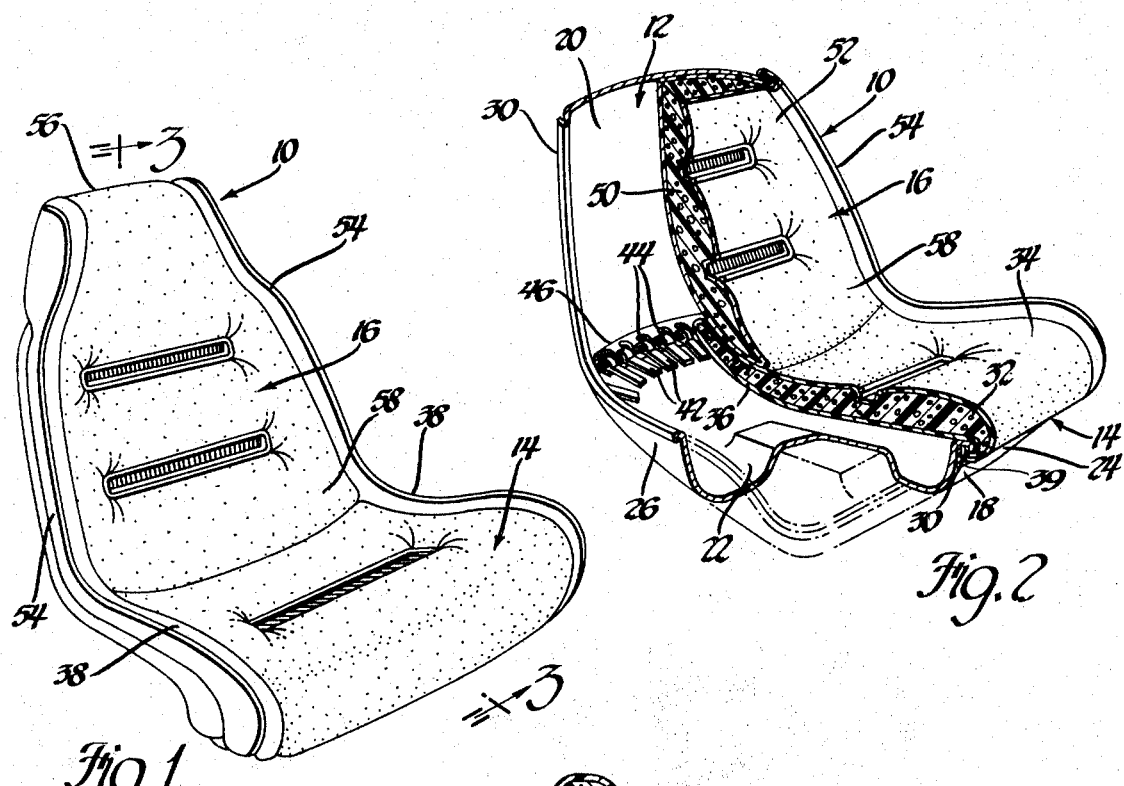
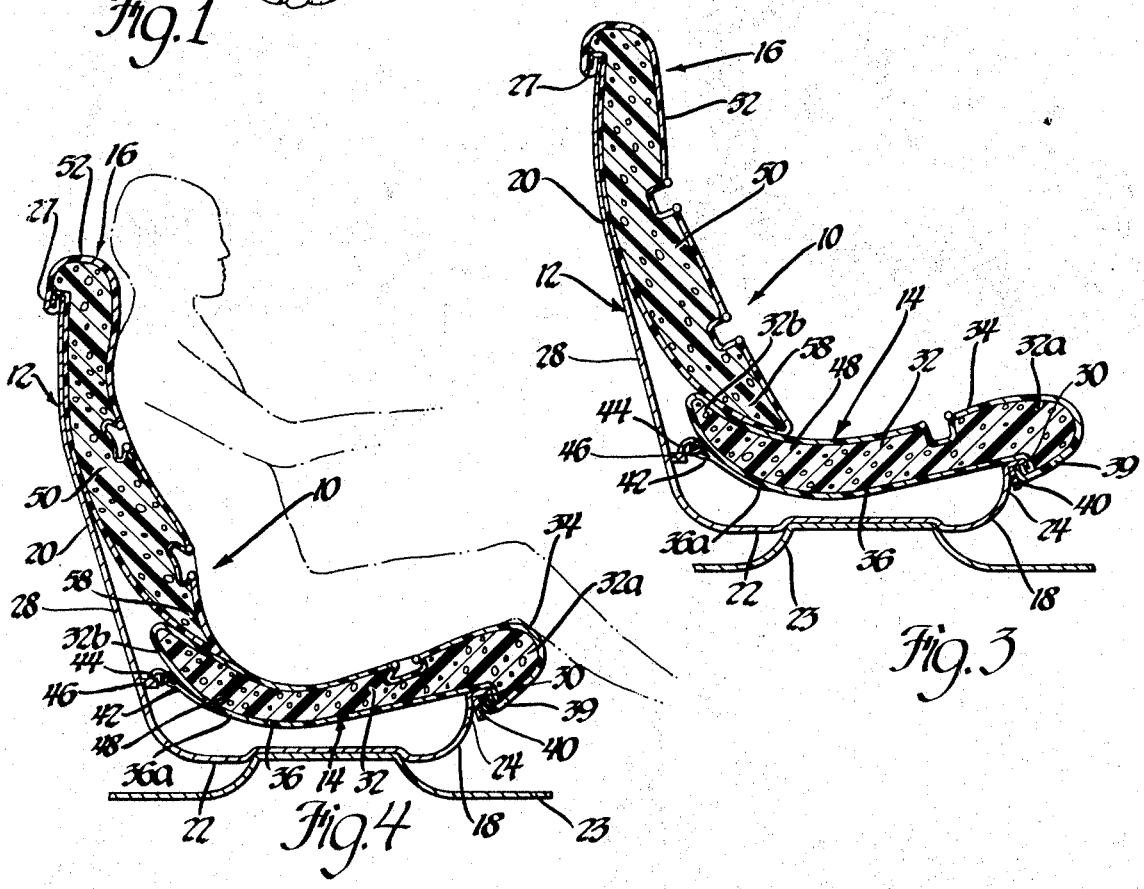

VEHICLE SEAT CONSTRUCTION

The present invention relates to a vehicle seat construction, and more particularly to a vehicle seat construction which serves to firmly support the lower back portion of a seat occupant.

Conventional vehicle seat trim constructions comprise cushion and back trim assemblies which are supported upon a seat frame. In many such conventional vehicle seat constructions, the rearward portion of the cushion trim assembly and the lower portion of the back trim assembly meet or overlap at a bite line in a straight or nearly straight angular relationship. That is, that portion of the seat trim construction in the area of the bite line between the cushion and back trim assembly is not contoured so as to completely support the lower back regions of an occupant. In still other conventional seat trim assemblies, the bite line region between the cushion and back trim assemblies are contoured to some degree. However, when the seat is occupied the cushion trim assembly is depressed and separates at the bite line from the contoured lower portion of the back trim assembly. Thus, a portion of an occupant's lower back, generally in the lumbar and sacral regions, is not fully supported. As a result, a person occupying a particular seat construction for longer periods of time can develop some discomfort in his lower back region.

The prior art shows that seat constructions have heretofore been provided with additional pads at the lower portion of the back trim assembly to provide support for the lower back region of an occupant. For example, see U.S. Pat. No. 3,371,957. Further, seat constructions have heretofore been provided with additional contoured padding extending from the top of the back trim assembly to the bite line between the cushion and back trim assemblies with the purpose of providing greater support for the whole thoracic region of an occupant. For example, see U.S. Pat. Nos. 3,446,531 and 2,229,160.

An object of the present invention is to provide a new and improved vehicle seat construction which conforms to the shape of an occupant and which provides firm support of the lower back region of an occupant.

Another object of the present invention is to provide a new and improved vehicle seat construction, as described in the preceding object, and which comprises a seat frame that has cushion and back support portions, a padded cushion trim assembly which is peripherally secured to the cushion support portion of the frame and which is suspended thereacross and which has a rearward portion contoured upwardly adjacent the back support portion of the frame, the rearward portion is connected with the back support portion with resilient means to provide for the cushion trim assembly to conform to the shape of an occupant, and a padded back trim assembly which is positioned upon the back support portion of the frame and which has a lower portion depending forwardly over and engaging the upwardly contoured rearward portion of the cushion trim assembly and wherein the cushion and back trim assemblies, when the seat construction is occupied, conform to the shape of the seat occupant with the rearward portion of the cushion trim assembly and the lower portion of the back trim assembly firmly supporting the lower back region of the seat occupant.

These and other objects of the present invention are accomplished in a preferred embodiment of the present invention by providing a vehicle seat construction which comprises a shell or bucket type seat frame with cushion and back support portions and with the cushion support portion having a bottom and forward and lateral upwardly extending side. The seat construction also includes a cushion trim assembly which comprises a molded foam pad which is sandwiched between an upper cover and an underside fabric layer and which has its forward edge secured to the forward side and its side edges secured to the lateral sides of the cushion portion of the seat frame in a manner such that the cushion trim assembly is suspended over the bottom of the cushion portion of the seat frame. The cushion trim assembly also has a rear portion which is contoured upwardly adjacent the back support portion of the seat frame and has a plurality of resilient straps which extend from the rear portion thereof and which are connected with retaining rings to the back support portion of the frame. The seat construction further comprises a padded back trim assembly which is positioned over and which has its upper and side edges secured to the back support portion of the seat frame and which has a lower padded portion that depends forwardly over and engages the contoured rearward portion of the cushion trim assembly. The cushion and back trim assemblies, when the seat construction is occupied, conform to the shape of the seat occupant and the rearward portion of the cushion trim assembly and the lower protion of the back trim assembly cooperate to firmly support the lower back of the occupant.

These and other objects of the present invention will become more fully apparent from the following description and drawings wherein:

FIG. 1 is a perspective view of the vehicle seat construction of the present invention;

FIG. 2 is a view similar to FIG. 1 but with portions removed;

FIG. 3 is a cross-sectional view taken along line 3—3 in FIG. 1; and

FIG. 4 is a view similar to FIG. 3 but showing the seat construction occupied by an occupant.

As representing a preferred embodiment of the present invention, the drawings show a vehicle seat construction 10 of a single occupant or bucket type and which broadly comprises a seat frame 12, a cushion trim assembly 14 and a back trim assembly 16.

With reference to FIGS. 2 – 4, the seat frame 12 is herein shown as being a one piece, shell type seat frame of steel but which could be of any other suitable material such as plastic. The seat frame 12 has a horizontal cushion support portion at its lower end and a vertical back support portion 20. The cushion support portion 18 is generally bowl-shaped and includes a bottom portion 22 which is mounted by any suitable means (not shown) to the floor 23 of a vehicle (not shown), a forward wall 24 which extends upwardly from the bottom portion 22, and a pair of lateral walls 26 which also extend upwardly from the bottom portion 22.

The back support 20 also extends upwardly from the bottom portion 22 of the cushion support 18 from between the lateral walls 26 and opposite the forward wall 24 and terminates at an upper end 27. Consequently, the lower end 28 of the back support portion 20 defines a rear wall for the cushion support portion 18. Last, the shell type seat frame 12 has a continuous, reversely bent flange 30 which extends continuously around the periphery of the back support portion 20 and along the edges of the forward and lateral walls 24 and 26, respectively, of the cushion support portion 18.

Referring to FIGS. 1 – 3, the cushion trim assembly 14 is shown as being positioned over the cushion support portion 18 of the seat frame 12 and in a suspended position over the bottom portion 22 thereof. The cushion trim assembly 14 generally comprises a molded foam pad 32 which is contoured from its forward portion 32a toward its rearward portion 32b and with the latter being upwardly contoured. The molded foam pad 32 is sandwiched between an upper cover 34, which can be of any suitable material such as vinyl or fabric, and an underside fabric 36. The upper cover 34, the pad 32 and the underside fabric 36 are joined by a sewing operation along the side edges 38 and forward edge 39 of the cushion trim assembly 14. The upper cover 34 is also joined to the pad 32 by a sewing operation at the rear end 32b of the pad 32.

A continuous thin plastic retainer strip 40 is attached to the cushion trim assembly 14 along the side edges 38 and forward edge 39 of the cushion trim assembly 14 either concurrently with the joining of the cover 34, pad 32, and underside fabric 36 or by another subsequent sewing operation. The retainer strip 40, during assembly of the seat construction 10, is received behind the reversely bent flange 30 of the seat frame 12, in a manner well known to those skilled in the art in order to retain the cushion trim assembly 14 upon the cushion support portion 18 of the seat frame 12. Further, the rear edge 36a of the underside fabric 36 has a plurality of resilient straps or loops 42 attached at one end thereto by any suitable means, such as by a sewing operation, and which are secured at their other ends to the lower end 28 of the back support portion 20 of the seat frame. These resilient straps 42 are attached to the back support portion 20 of the seat frame 12 by means of retaining rings 44 which are received through loops at the ends of the resilient straps 42 and which are crimped through complementary shaped holes in a horizontal bar 46 which extends across the lower end 28 of the back support portion 20. Thus, it should be understood that the cushion trim assembly 14 is peripherally secured about its side edges 48 and forward edge 39 to the lateral walls 26 and forward walls 24 of the cushion support portion 18 of the seat frame 12 and that its rearward portion 48 is resiliently secured via the resilient straps 42 to the lower end 28 of the back support portion 20 of the seat frame 12. In this manner the cushion trim assembly 14 is effectively suspended over the bottom portion 26 of the cushion support portion 18. Significantly, by virtue of the upwardly contoured rearward end 32b of the pad 32 and the securing of the rearward edge 36a of the underside fabric 36 to the back support portion 20 via the resilient straps 42, the rearward portion 48 of the cushion trim assembly 14 is contoured upwardly and adjacent the back support portion 20 of the seat frame 12.

The back trim assembly 16 includes a contoured, molded foam pad 50 and an upper cover 52, of any suitable material, such as a vinyl or fabric, which are also joined peripherally by a sewing operation. The back trim assembly 16 also includes a thin plastic retainer strip 40 on its side edges 54 and upper edge 56 which is received behind the reversely bent flange 30 of the back support portion 20 of the seat frame 12 in order to peripherally retain the back trim assembly 16 thereon. Significantly, the lower portion 58 of the back trim assembly 16 is contoured forwardly to depend over and to be supported upon the rearward portion 48 of the cushion trim assembly 14.

Referring particularly to FIG. 4, it should be seen that when a passenger of the vehicle sits in the seat construction 12, the back trim assembly 16 generally conforms to the shape of the thoracic region of the occupant. Further, the cushion trim assembly 14 is compressed, and, by virtue of the resilient straps 42 connecting the cushion trim assembly 14 to the back support portion of the seat frame 12, the central portion of the cushion trim assembly 14 gives significantly under the weight of the occupant. While the central portion of the cushion trim assembly 14 gives substantially under the weight of the occupant and therefore generally conforms to the shape of the occupant's posterior and thighs, the rearward portion 48 of the cushion trim assembly 14 remains in substantially the same position which it assumes when the seat construction 10 is unoccupied. Thus, the rearward portion 48 of the cushion trim assembly 14 is located adjacent the sacral region of the occupant. Because the rearward portion of the cushion trim assembly 14 remains in substantially one position even when the seat is occupied and because of the overlap of the lower portion 58 of the back trim assembly 16 therewith, the lower portion 58 of the back trim assembly 16 conforms to the shape of and firmly supports the lumbar and sacral regions of the seat occupant.

The foregoing disclosure relates to only one embodiment of the present invention which may be modified within the scope of the appended claims.

What is claimed is:

1. A vehicle seat construction comprising: a seat frame having cushion and back support portions; a padded cushion trim assembly peripherally secured to said cushion support portion of said frame and suspended thereacross, said padded cushion trim assembly having a curved rearward portion extending upwardly adjacent said back support portion of said frame; resilient means having one end connected with said back support portion and its other end connected with said cushion trim assembly adjacent its curved rearward portion, said cushion support portion of said frame and said resilient means providing the sole support for said cushion trim assembly; and a padded back trim assembly positioned upon said back support portion of said frame and having a curved lower portion overlying said upwardly extending rearward portion of said cushion trim assembly, said rearward portion of said cushion trim assembly and said lower portion of the back trim assembly being movable relative to each other when said seat construction is occupied whereby the seat construction conforms to the shape of said occupant and with said rearward portion of said cushion trim assembly and said lower portion of said back trim assembly firmly supporting the lower back of the seat occupant.

2. A vehicle bucket seat construction comprising: a shell-type seat frame having cushion and back support portions; a padded cushion trim assembly with forward and side edges secured to said cushion support portion of said frame and being suspended across said cushion support portion, said padded cushion trim assembly having a curved rearward portion contoured upwardly adjacent said back support portion of said frame, said cushion trim assembly having its rearward portion connected with said back support portion of said frame by resilient strap means to allow said cushion trim assembly to move relative to said frame; said cushion support portion of said frame and said resilient means providing the sole support for said cushion trim assembly; and a back trim assembly secured to said back support portion of said frame and having a curved lower portion overlying and shaped substantially complementary with said curved rearward portion of said cushion trim assembly and being slidably engaged with said contoured rearward portion of said cushion trim assembly, said rearward portion of said cushion trim assembly and said lower portion of said back trim assembly being slidable relative to each other when the seat construction is occupied by an occupant whereby the seat construction conforms to the shape of the occupant and the rearward portion of said cushion trim assembly and said lower portion of said back trim assembly firmly support the lower back of the seat occupant.

3. A vehicle seat construction comprising: a shell-type seat frame with seat cushion and back support portions, said cushion support portion having a bottom and forward and lateral upwardly extending sides; a cushion trim assembly comprising a molded foam pad sandwiched between an upper cover and an underside fabric layer, said cushion trim assembly having its forward edge secured to said forward side and its side edges secured to said lateral sides of said cushion portion of said seat frame such that said cushion trim assembly is suspended over said bottom of said cushion portion of said seat frame, said cushion trim assembly having a curved rearward portion contoured upwardly adjacent said back support portion of said seat frame, said cushion trim assembly having a plurality of resilient straps extending from said rearward portion and connected to retaining rings on said back support portion of said frame; said cushion support portion of said frame and said resilient means providing the sole support for said cushion trim assembly; and a padded back trim assembly positioned over and having its upper and side edges secured to said back support portion of the seat frame and having a curved lower padded portion overlying said curved rearward portion of said cushion trim assembly and slidably engaged with said curved rearward portion of said cushion trim assembly, said cushion and back trim assemblies when the seat construction is occupied conforming to the shape of the occupant and said rearward portion of said cushion trim assembly and said lower portion of said back trim assembly firmly supporting the lower back of the occupant.

* * * * *